W. MILLER.
PROCESS OF RECOVERING ALCOHOL AND OTHER VOLATILE SUBSTANCES FROM EMPTY BARRELS, CASKS, &c.
APPLICATION FILED SEPT. 7, 1909.
951,507.
Patented Mar. 8, 1910.
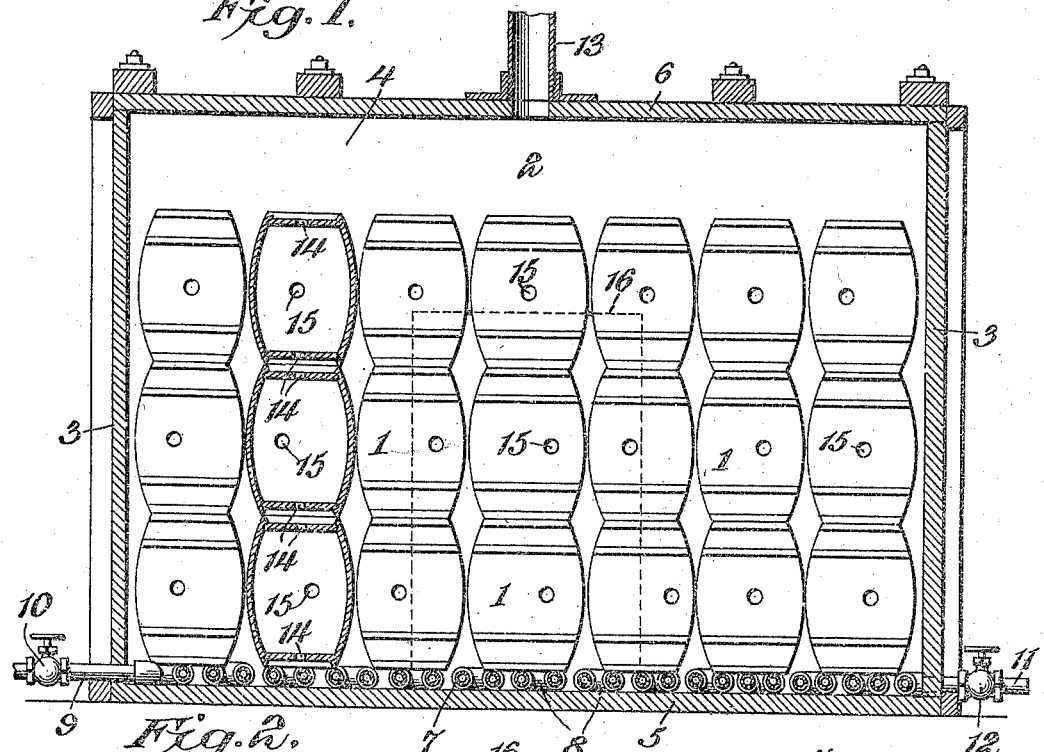
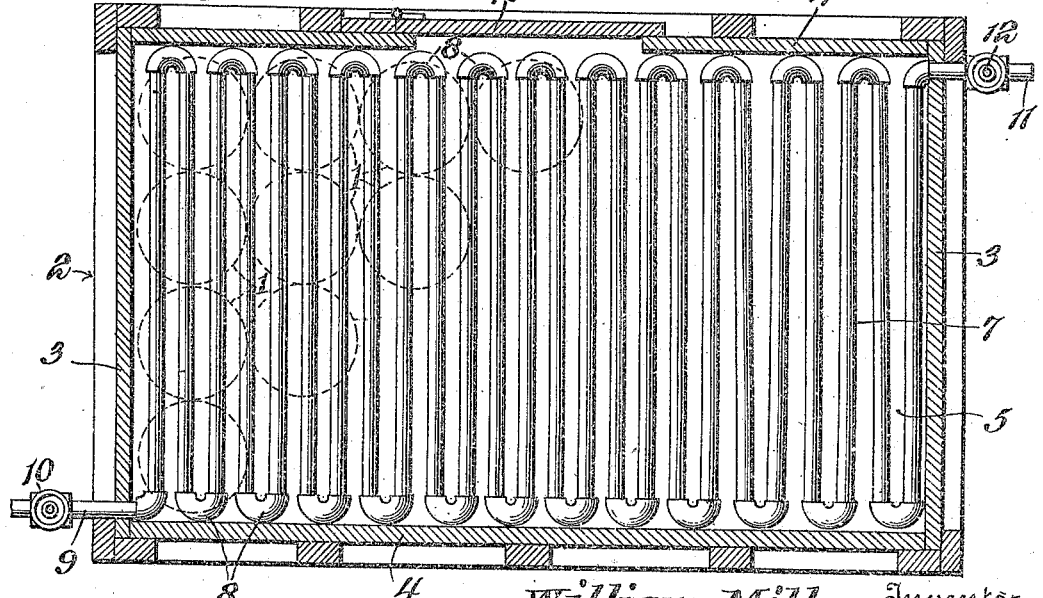
William Miller, Inventor,
Witnesses

UNITED STATES PATENT OFFICE.

WILLIAM MILLER, OF WESTFIELD, NEW JERSEY.

PROCESS OF RECOVERING ALCOHOL AND OTHER VOLATILE SUBSTANCES FROM EMPTY BARRELS, CASKS, &c.

951,507.   Specification of Letters Patent.   Patented Mar. 8, 1910.

Application filed September 7, 1909. Serial No. 516,387.

*To all whom it may concern:*

Be it known that I, WILLIAM MILLER, a subject of the King of Great Britain, residing at Westfield, in the county of Union and State of New Jersey, have invented a new and useful Process of Recovering Alcohol and other Volatile Substances from Empty Barrels, Casks, &c., of which the following is a specification.

The invention relates to an improved process of extracting and recovering alcohol or other volatile substances from empty barrels, casks, etc.

Heretofore alcohol or other volatile substances have been extracted from empty barrels and casks by subjecting the same to the action of hot air, but owing to the great length of time required to extract the alcohol, the fiber of the wood has been so injured by the heat as to materially reduce the value of the barrels.

The object of the present invention is to provide an improved process, capable of enabling the alcohol or other volatile substance contained in the wood of the empty barrels and casks to be thoroughly extracted before the wood is affected by the heating medium, whereby the barrels and casks will be thoroughly cleaned and the alcohol or other volatile substance recovered without injury to the barrels, casks, etc.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a longitudinal sectional view, illustrating an apparatus for conveniently practicing my improved process. Fig. 2 is a horizontal sectional view of the same.

Like numerals of reference designate corresponding parts in all the figures of the drawing.

In carrying out the improved process, the empty barrels 1 or analogous receptacles are placed within an inclosed heating chamber or still 2. The inclosed chamber 2, which can be of any preferred construction, may conveniently consist of a room or casing, having wooden walls 3 and 4, a wooden bottom 5 and a wooden ceiling 6, but the walls may be constructed in any other preferred manner.

The barrels 1 are arranged upon a heating device 7, preferably consisting of parallel transversely disposed steam pipes, connected at their ends by couplings 8 and forming a continuous passage for steam, whereby the air is highly heated at the bottom of the chamber and caused to ascend and circulate through the barrels 1. The steam is admitted to the heating device through an inlet or feed pipe 9, having a regulating or controlling valve 10, and the condensed steam is discharged from the heating device through an outlet or discharge pipe 11, having a valve 12. A pipe or conduit 13 extends from the top of the chamber and communicates with the interior thereof through an opening in the top wall or ceiling 6. This pipe or conduit is connected with a suitable condenser (not shown) for condensing the volatilized alcohol or other substance and recovering the same in the usual manner. As this step of the process is well known and thoroughly understood in the art, illustration of a condenser is deemed unnecessary.

In order to enable the alcohol to be extracted in a sufficiently short time to prevent the barrels from being injured by the heat, the barrels before being placed within the chamber 2 are pierced at each end or head to provide small vent holes 14, which may be conveniently plugged after the barrels have been removed from the chamber. The vent holes 14 and the open bung holes 15 permit the hot air to enter the barrels and the cold air to escape therefrom. The action is facilitated by arranging the barrels in an upright position, although it is not necessary to have them in perfect tiers, as illustrated in the drawing, and the process may be carried on with the barrels arranged in any position. The hot air heated by the steam pipes causes the alcohol or other volatile substance contained in the wood to evaporate in a little over an hour and before the fiber of the wood is injured by the heat, whereas it has required from eight to twelve hours to extract the alcohol from a barrel having only an open bung hole for the entrance of hot air and the escape of the volatilized substance. This long baking destroys the very life of the wood. The present process applies the heating medium simultaneously to the interior and exterior of the barrels or other receptacles, and it will be apparent that the volatile substances are extracted in much less time and with a lower degree of heat than where the heat is applied practically to the exterior only, and where the wood has to be heated through from the exterior to produce distillation or evaporation at the interior.

The barrels may be placed directly upon the steam pipes and do not require any other support. A suitable door 16 is provided at one of the walls for enabling the barrels to be placed in and removed from the heating chamber or still.

Having thus fully described my invention, what I claim as new and desire to secure by Letters Patent, is:—

1. The herein described process of recovering alcohol or other volatile substances from barrels, casks, etc., consisting in forming an opening in each end of each barrel in addition to the bung hole, one opening to permit the entrance of warm air and the other the escape of cold air, arranging the barrels in a closed receptacle, and subjecting the barrels interiorly and exteriorly to the action of warm air, which is introduced at the bottom of the receptacle, whereby the soakage is caused to evaporate rapidly from the wood and may be carried off and removed without injury to the same.

2. The herein described process of recovering alcohol and other volatile substances from barrels, casks, etc., consisting in forming an opening in each head of each barrel in addition to the bung hole, one opening to permit the entrance of warm air and the other the escape of cold air, arranging the barrels one above another in a closed receptacle, supporting the barrels upon the heating means to cause a circulation of warm air through the barrels, whereby the soakage is rapidly evaporated from the wood and may be removed therefrom without injury to the barrels, conveying away the volatilized substance from the top of the receptacle, and condensing the said substance.

3. The herein described process of recovering alcohol and other volatile substances from barrels, casks, etc., consisting in forming openings in both heads of each barrel in addition to the bung hole, arranging the barrels one upon another in a closed receptacle, and locating heating means below the barrels to cause a circulation of warm air through the same, whereby soakage is rapidly evaporated from the wood without injuring the barrels.

In testimony, that I claim the foregoing as my own, I have hereto affixed my signature in the presence of two witnesses.

WILLIAM MILLER.

Witnesses:
JOHN H. SIGGERS.
DAVID R. WAGNER.